US012503904B2

(12) United States Patent
Lee et al.

(10) Patent No.: US 12,503,904 B2
(45) Date of Patent: Dec. 23, 2025

(54) SAFE DOOR AND SAFE COMPRISING SAME

(71) Applicant: HYOSUNG TNS INC., Seoul (KR)

(72) Inventors: Sanghee Lee, Seoul (KR); Yun Seok Jeong, Seoul (KR); Hyun Jin Kim, Seoul (KR); Byoung Chan Kang, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/692,363

(22) PCT Filed: Sep. 15, 2022

(86) PCT No.: PCT/KR2022/013793

§ 371 (c)(1),
(2) Date: Mar. 15, 2024

(87) PCT Pub. No.: WO2023/043227

PCT Pub. Date: Mar. 23, 2023

(65) Prior Publication Data

US 2024/0368922 A1 Nov. 7, 2024

(30) Foreign Application Priority Data

Sep. 17, 2021 (KR) ........................ 10-2021-0124737

(51) Int. Cl.
*E05G 1/026* (2006.01)
*E05B 65/00* (2006.01)
*E05G 1/04* (2006.01)

(52) U.S. Cl.
CPC .......... *E05G 1/026* (2013.01); *E05B 65/0082* (2013.01); *E05G 1/04* (2013.01)

(58) Field of Classification Search
CPC . E05B 65/0075; E05B 65/0082; E05G 1/026; E05G 1/04
See application file for complete search history.

(56) References Cited

U.S. PATENT DOCUMENTS 4,147,044 A * 4/1979 Bernath .............. E05B 65/0082 70/1.5
4,520,736 A * 6/1985 Crosby ............... E05B 65/0082 70/1.5
(Continued)

FOREIGN PATENT DOCUMENTS

CN 211287219 U 8/2020
KR 10-2005-0115537 A 12/2005
(Continued)

OTHER PUBLICATIONS

Search Report dated Dec. 15, 2022, issued in corresponding PCT application No. PCT/KR2022/013793.
(Continued)

*Primary Examiner* — Christopher J Boswell
(74) *Attorney, Agent, or Firm* — BACON & THOMAS, PLLC

(57) ABSTRACT

A safe door includes: a body part; a locking part configured to be in one of a locked state in which the lock part protrudes from the body part and an open state in which the locking part is deviated from the locked state; and a relocking unit configured to restrict a movement of the locking part. The relocking unit includes: an actuator; a relocking bracket provided in a bracket form covering an outer shape of the actuator and movable by operation of the actuator; and a relocking member mounted on an end of the relocking bracket and configured to restrain the locking part by movement of the relocking bracket.

11 Claims, 8 Drawing Sheets

1

(56) References Cited

U.S. PATENT DOCUMENTS

| | | | | | |
|---|---|---|---|---|---|
| 4,679,415 | A * | 7/1987 | Spratt | E05B 65/0075 70/1.5 |
| 4,754,629 | A * | 7/1988 | Allen | E05B 65/0082 109/42 |
| 5,231,935 | A * | 8/1993 | Oder | E05B 65/0082 70/1.5 |
| 5,603,234 | A * | 2/1997 | Lozier | E05B 65/0075 70/120 |
| 5,942,973 | A * | 8/1999 | Lee | E05B 65/0082 70/279.1 |
| 7,156,298 | B2 * | 1/2007 | McCracken | E05B 65/0075 902/8 |
| 7,665,405 | B2 * | 2/2010 | Evans | E05B 65/0075 70/120 |

FOREIGN PATENT DOCUMENTS

| | | | |
|---|---|---|---|
| KR | 10-0869609 | B1 | 11/2008 |
| KR | 10-1306900 | B1 | 9/2013 |
| KR | 10-1306902 | B1 | 9/2013 |
| KR | 10-1396240 | B1 | 5/2014 |
| KR | 10-1795210 | B1 | 11/2017 |

OTHER PUBLICATIONS

Office Action issued on Sep. 22, 2025 in corresponding Korean application No. 10-2021-0124737.

* cited by examiner

SAFE DOOR AND SAFE COMPRISING SAME

TECHNICAL FIELD

The present disclosure relates to a safe door and a safe including the same.

BACKGROUND ART

In general, safes are used to store valuables such as cash, securities, jewelry, and valuable documents and are used to prevent unauthorized taking of valuables by preventing third parties other than the owner of the valuables from opening the safes.

The door of such a safe is opened and closed using a locking device to prevent third parties from taking valuables without permission. That is, the door is usually locked by a locking device after the case is closed to store valuables, but when the user puts valuables into or out of the case, the locking device is released and the door can be opened.

However, as safe-related technology has recently developed, technologies for opening safes illegally are also being continuously developed. For example, there are cases in which a door locking device is broken or a small hole is drilled in the door to unlock the locking device.

Therefore, there is a need for a device that can further improve the safety of a safe and delay the opening of the safe as much as possible until the police can take appropriate action even if the safe is opened by a third party.

DETAILED DESCRIPTION OF INVENTION

Technical Problems

An embodiment of the present disclosure devised in view of the above background provides a safe door that can improve the safety of a safe.

Additionally, an embodiment of the present disclosure provides a safe door that can delay opening of a safe as much as possible.

Technical Solution

A safe door according to an aspect of the present disclosure includes a body part; a locking part configured to be in one of a locked state in which the lock part protrudes from the body part and an open state in which the locking part is deviated from the locked state; and a relocking unit configured to restrict a movement of the locking part, wherein the relocking unit includes: an actuator; a relocking bracket provided in a bracket form covering an outer shape of the actuator and movable by operation of the actuator; and a relocking member mounted on an end of the relocking bracket and configured to restrain the locking part by movement of the relocking bracket.

Further, the relocking unit may allow the locking part to be in one of the locked state and the open state through a movement of the relocking member in response to the operation of the actuator.

Further, the safe door may further include a main support part supporting the locking part and configured to be movable with respect to the body part; a connector having one side in which a virtual rotation axis extending in a front and rear direction, and the other side connected to the main support part; and a base part mounted on the body part to support the relocking unit.

Further, the relocking member may include: a relocking pin configured to be fixed to a first main rod of the main support part to restrain the locking part; a connecting rod having one end portion connected to an end portion of the relocking bracket and the other end portion connected to the relocking pin, a connecting groove being formed in the other end portion of the connecting rod; a connecting pin mounted in the connecting groove to be removable at an end of the connecting rod and inserted into a fixing groove formed in the body part when the relocking pin restrains the main support part; and an elastic spring for elastically supporting the connecting pin in the connecting groove.

Further, the relocking bracket may include: a bracket frame provided in a bracket form covering a side and a bottom of the actuator; and a bracket guide groove formed on one side of the bracket frame to be parallel to a moving direction of the relocking pin.

Further, the safe door may further include safety glass disposed adjacent to the body part and configured to be broken when an external force is applied to force the locking part to change from the locked state to the open state.

Further, the safety glass may be disposed between the body part and the base part, and may include a catching hole extending in an up and down direction.

Further, the relocking bracket may further include a bracket hook protruding toward the safety glass to be hooked in the catching hole of the safety glass.

Further, the bracket hook may be formed integrally with the other side of the bracket frame to be lifted and lowered together with the bracket frame when the bracket frame is lifted and lowered in the locked state for locking the locking part and the open state deviated from the locked state.

Further, the locking part may include a plurality of locking shafts spaced apart from each other along a periphery of the body part, and the main support part may be configured to be movable in a first direction in response to the connector rotating about the rotation axis such that the locking part is switched from one of the locked state and the open state to the other state, some of the plurality of locking shafts may be configured to move in the first direction, and others of the plurality of locking shafts may be configured to move in a second direction perpendicular to the first direction.

A safe according to another aspect of the present disclosure includes a safe case having a predetermined space formed inside; and a safe door configured to selectively open and close the space inside the safe case with respect to an outside, wherein the safe door includes: a body part; a locking part configured to be in one of a locked state in which the lock part protrudes from the body part toward the outside and an open state in which the locking part is deviated from the locked state; and a relocking unit for restricting movement of the locking part when an external impact is applied, wherein the relocking unit includes: an actuator; a relocking bracket provided in a bracket form covering an outer shape of the actuator and movable by operation of the actuator; and a relocking member mounted on an end of the relocking bracket and configured to restrain the locking part when the relocking bracket moves.

Further, the relocking unit may allow the locking part to be in one of the locked state and the open state through movement of the relocking member in response to the operation of the actuator.

Further, the safe may further include safety glass disposed adjacent to the body part and configured to broken when an external force is applied to force the locking part to change from the locked state to the open state.

Further, the relocking bracket may include a bracket hook protruding toward the safety glass to be caught in a catching hole of the safety glass.

Effect of Invention

According to an embodiment of the present disclosure, the locking part can be relocked by providing a lock protection function through the relocking unit and at the same time breaking the safety glass in the event of an external attack on the safe.

In addition, according to an embodiment of the present disclosure, the safety of the safe can be improved, and even if an illegal infiltration attempt occurs, opening of the safe can be delayed as much as possible until appropriate measures can be taken for safe security.

BEST MODE FOR CARRYING OUT THE INVENTION

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, or 'accessed' by another element, it should be understood that the element may be directly connected to, supported by, or accessed by the other element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

In addition, it should be noted in advance that in the present specification, expressions for directions such as a front and rear direction are explained based on the drawings, and may be expressed differently if the orientation of the object changes. Meanwhile, a first direction in the present specification may be a x-axis direction in FIGS. 1, 2, 4, 5, and 6, and may be a front and rear direction of the safe door, that is, the thickness direction of the safe door in a state in which the safe is closed by the safe door. The rear direction of the safe door may be a direction facing the inner space of the safe when the safe door is closed. Additionally, in the present specification, a second direction may be a y-axis direction in FIGS. 1, 2, 3, 4, 5, and 6, and may be a left and right direction of the safe. Additionally, in the present specification, a third direction may be a z-axis direction and may be an up and down direction of the safe. The first direction, second direction, and third direction may be perpendicular to each other.

Hereinafter, the specific configuration of a safe according to an embodiment of the present disclosure will be described with reference to the drawings.

Figure 1:
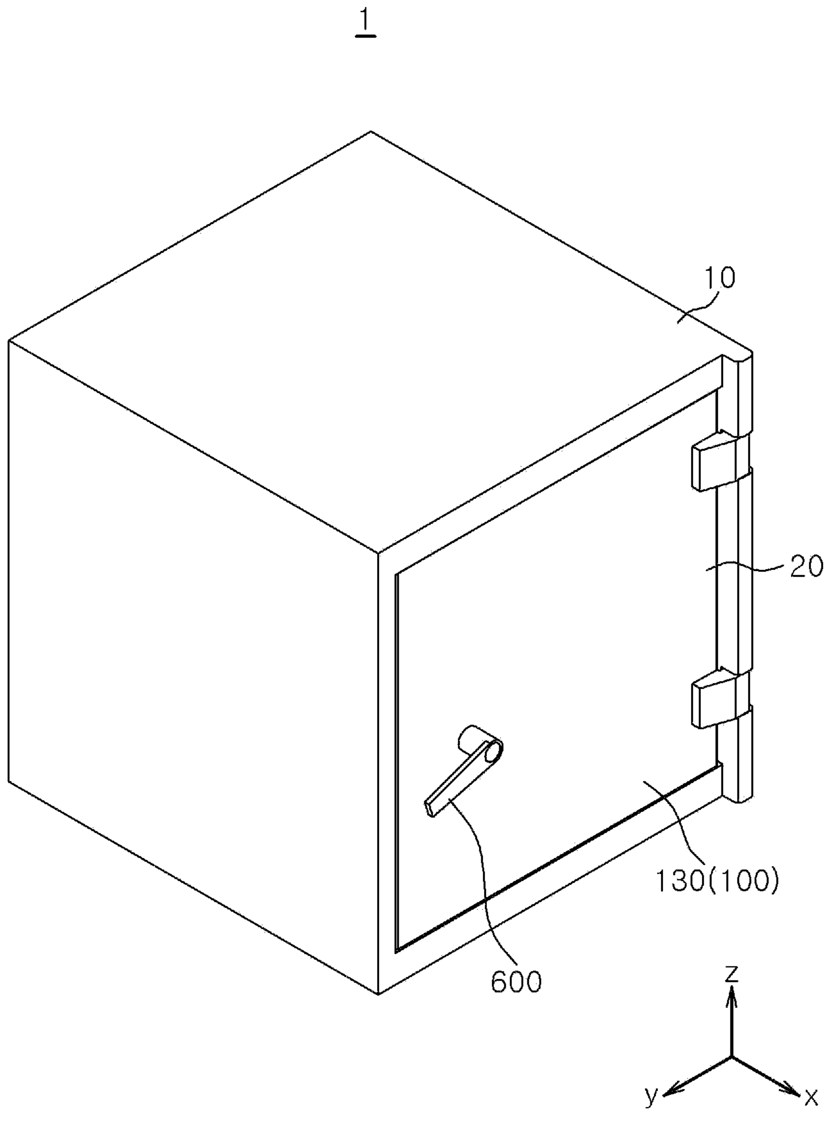
FIG. 1 is a perspective view showing a safe according to an embodiment of the present disclosure.
Figure 2:
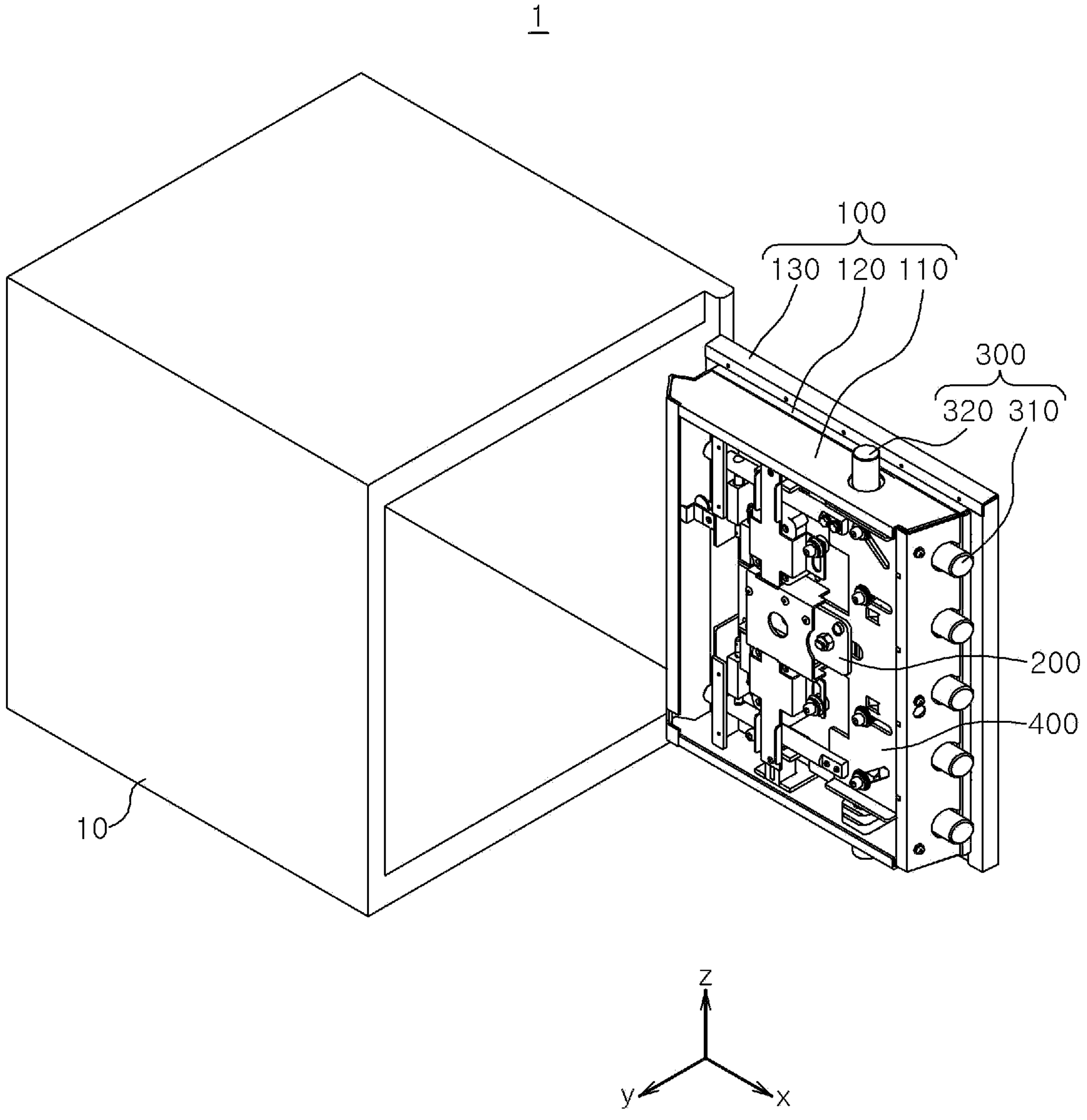
FIG. 2 is a perspective view showing a safe door of FIG. 1 in an open state.

Referring to FIGS. 1 and 2, the safe 1 according to an embodiment of the present disclosure has a predetermined space formed inside and can provide a space for storing valuables of a user. For example, the safe 1 can store user's valuables such as cash, securities, jewelry, and valuable documents. Additionally, the safe 1 can prevent stored valuables from being removed without permission by a third party other than the user. The safe 1 may include a safe case 10 and a safe door 20.

The safe case 10 may have a predetermined space inside to store valuables. The safe case 10 can be selectively opened and closed by the safe door 20. Additionally, the safe case 10 may have high rigidity such that the shape thereof is not easily deformed by external force. The safe case 10 may have a predetermined thickness such that it cannot be easily pierced with a tool such as a drill.

The safe door 20 can selectively open and close the space inside the safe case 10 to an outside. For example, the safe door 20 may be connected to the safe case 10 through a hinge. The safe door 20 can freely rotate about the safe case 10 in order to open and close the safe case 10 when a locking part 300, which will be described later, is in an open state. Additionally, the safe door 20 may not move relative to the safe case 10 when the locking part 300 is in a locked state with the entrance of the safe case 10 closed. In this case, the user cannot open the inside of the safe case 10 without unlocking the locking part 300.

The safe door 20 includes a body part 100, a connector 200, the locking part 300, a main support part 400, a handle 600, a base part 700, a locking unit 800, and a relocking unit 900.

Figure 3:
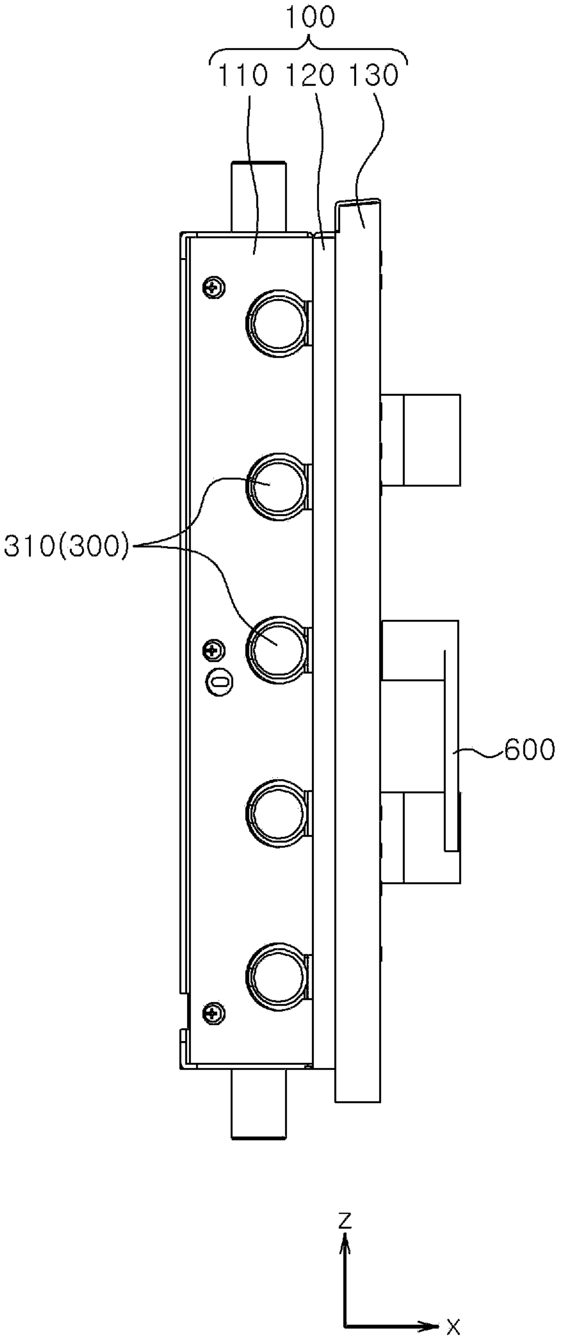
FIG. 3 is a side view of the safe door of FIG. 2.

Referring to FIGS. 2 and 3, the body part 100 may support the connector 200, the locking part 300, the main support part 400, the handle 600, and the base part 700.

The body part 100 may be connected to the safe case 10 through a hinge, for example, and may rotate about the safe case 10. Additionally, the body part 100 can selectively open and close the inside of the safe case 10 to the outside. The handle 600 may be disposed on a front outer surface of the body part 100, and the body part 100 may move together with the handle 600. In other words, when the user pulls the handle 600, the body part 100 can move relative to the safe case 10 while supporting the handle 600. The body part 100 may include a plurality of bodies 110, 120, and 130, and the plurality of bodies 110, 120, and 130 may include a first body 110, a second body 120, and a third body 130.

The first body 110 may be disposed rearward than the second body 120 and the third body 130. That is, the first body 110 may be disposed to face the internal space of the safe case 10. Additionally, the second body 120 may be disposed between the first body 110 and the third body 130, and the third body 130 may be disposed forward than the first body 110 and the second body 120 to face the outside.

The first body 110, the second body 120, and the third body 130 may have predetermined thicknesses in the front and rear direction and may be disposed to be overlapped in the front and rear direction. For example, when viewed in the front and rear direction, at least a portion of the first body 110 may be overlapped with the second body 120 and the third body 130.

In this manner, the first body 110, the second body 120, and the third body 130 are disposed in a three-layer structure, and thus even if the outermost third body 130 is damaged by an intruder, the inside of the safe case 10 can be protected by the first body 110 and the second body 120. In addition, even if the safe 1 is opened by an intruder, the time required for the intruder to penetrate all of the first body 110, the second body 120, and the third body 130 can be reduced as much as possible.

In particular, safety glass 710 may be provided on a rear surface (an inner side surface) of the body part 100, and more specifically, on the rear surface of the first body 110. The safety glass 710 is provided to be broken when an illegal intrusion attempt into the safe 1 occurs, and thus security measures for the safe 1 can be rapidly activated.

Figure 4:
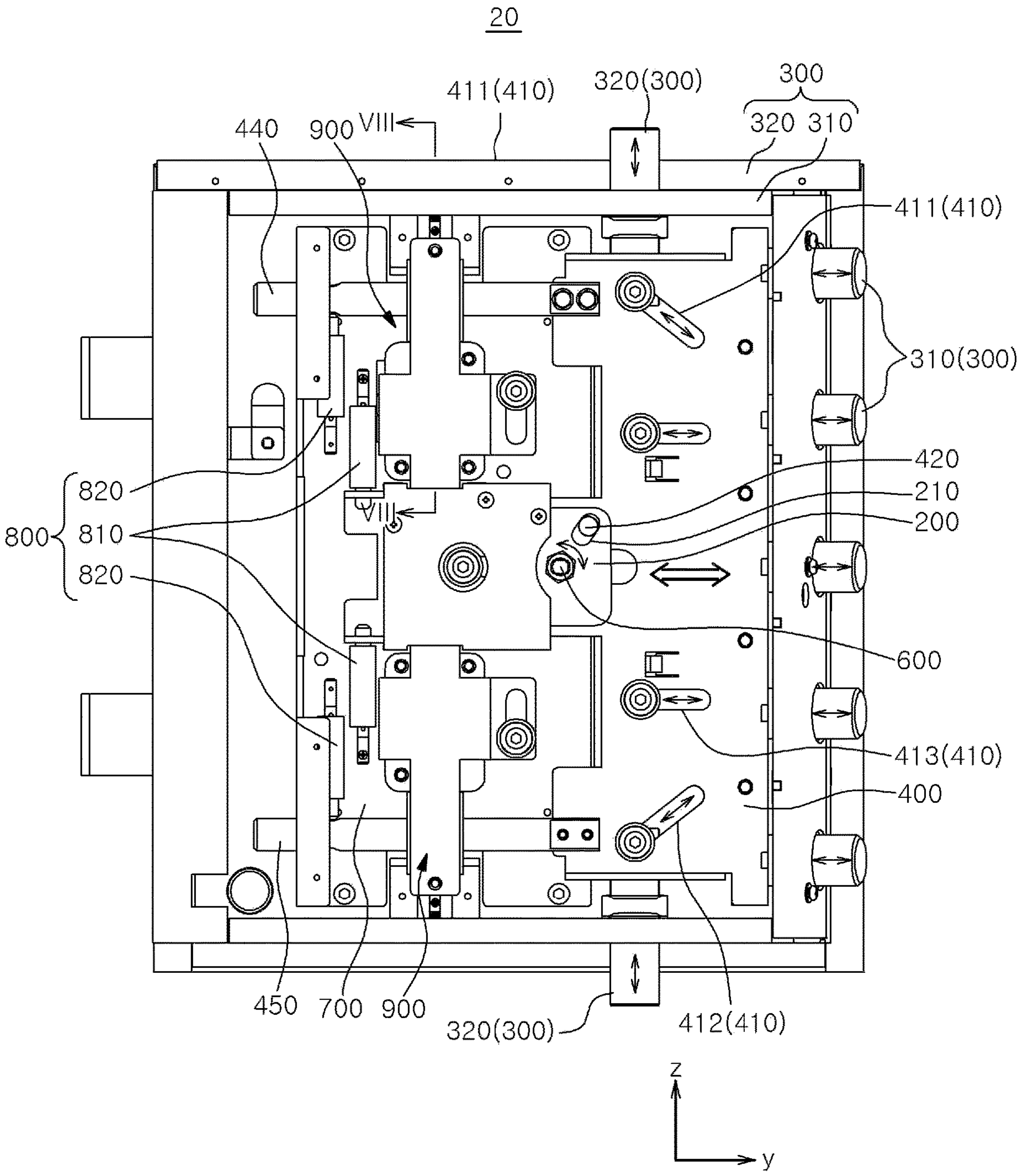
FIG. 4 is a view when a locking part of the safe door of FIG. 2 is in a locked state.
Figure 5:
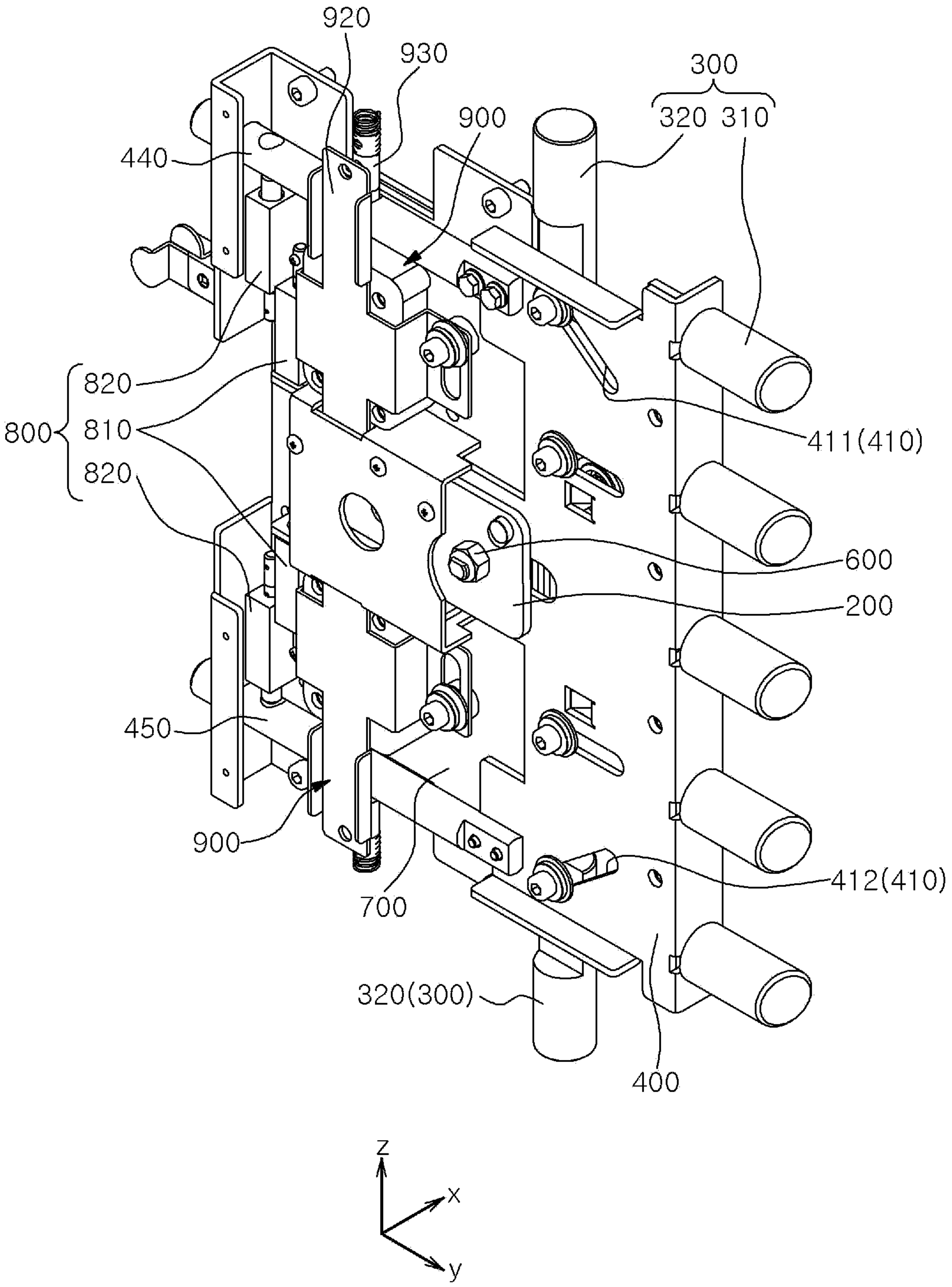
FIG. 5 is a perspective view showing main components of the safe door according to an embodiment of the present disclosure, viewed from one side.
Figure 6:
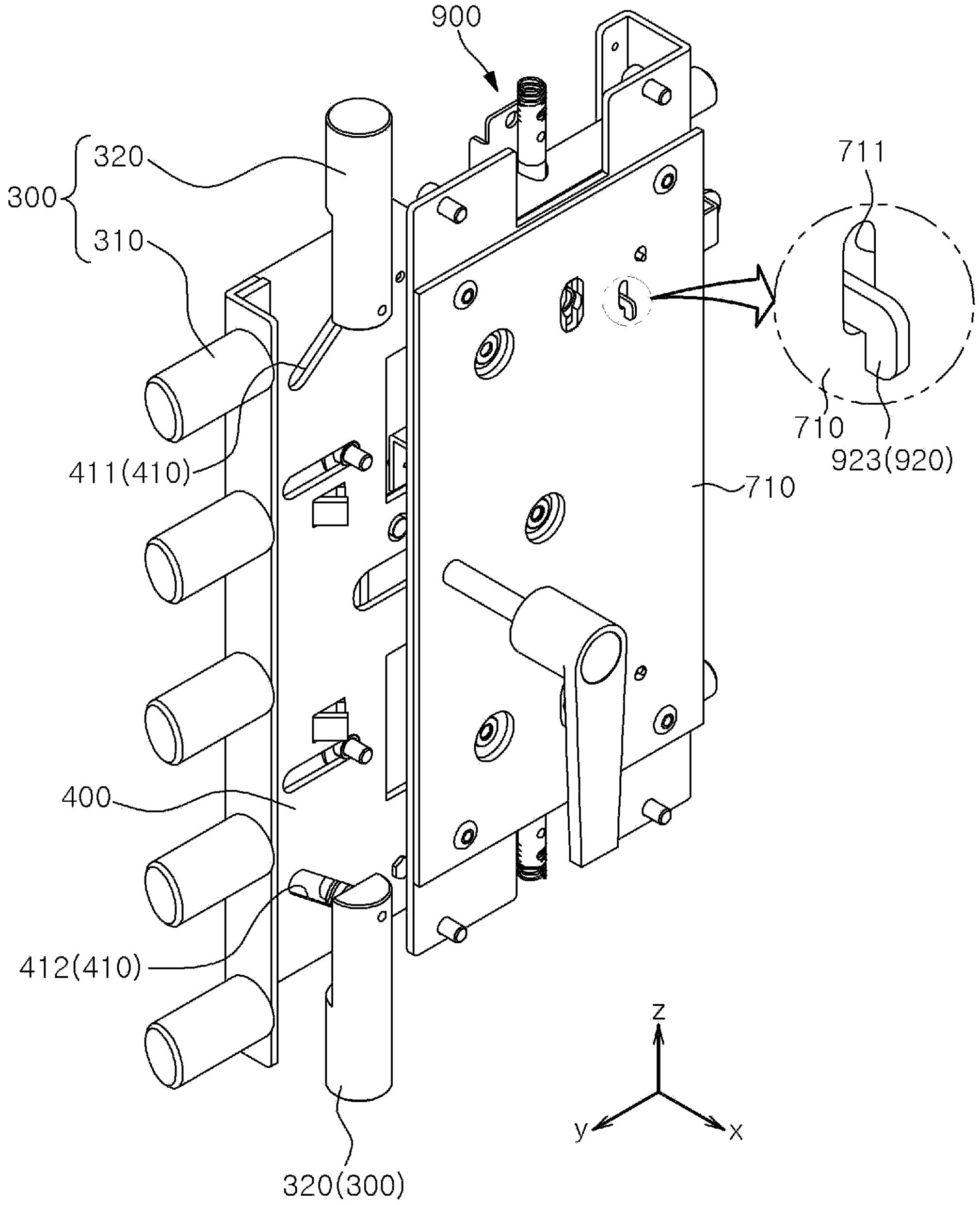
FIG. 6 is a perspective view showing the main components of the safe door according to an embodiment of the present disclosure, viewed from the other side.
Figure 7:
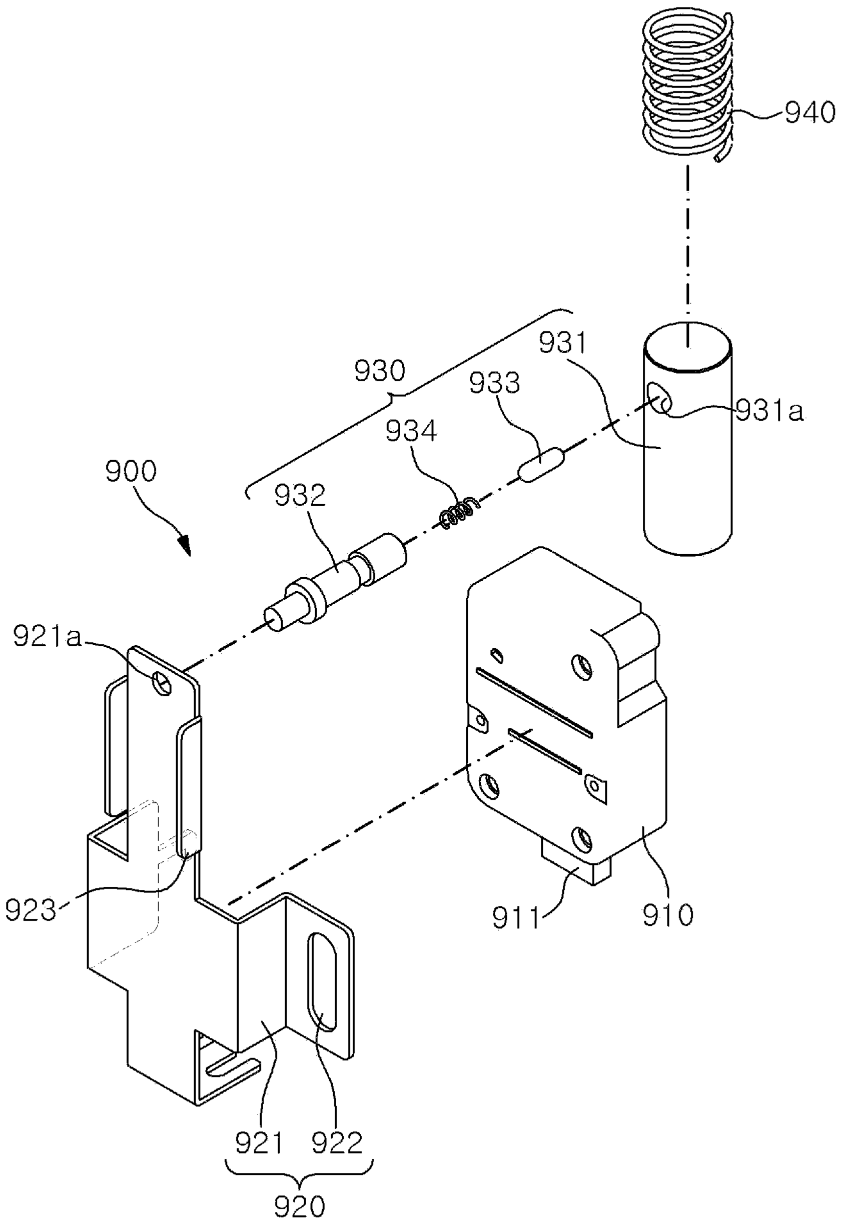
FIG. 7 is an exploded perspective view showing a relocking unit according to an embodiment of the present disclosure.
Figure 8:
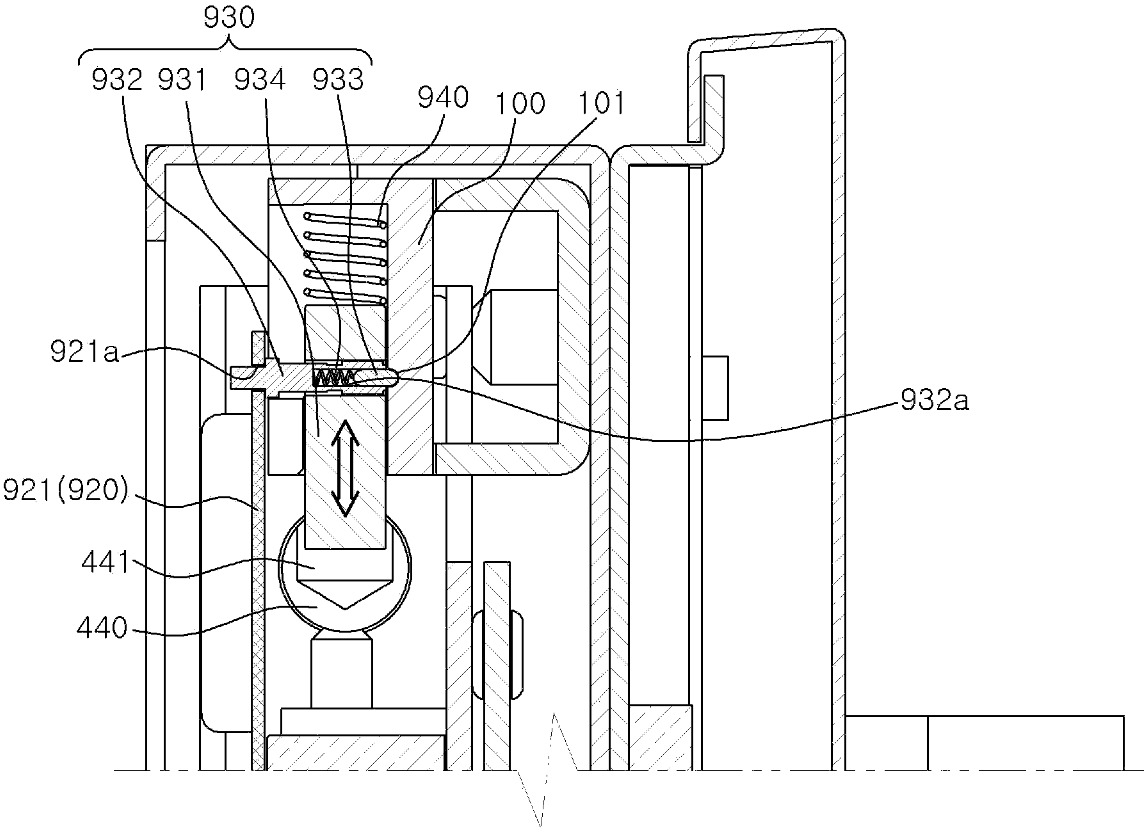
FIG. 8 is a cross-sectional view taken along line "VIII-VIII" of FIG. 4.

Referring to FIGS. 4 to 6, the connector 200 can convert a rotational movement of the handle 600 into a linear movement of the main support part 400. One side of the connector 200 may be connected to the handle 600 and the other side of the connector 200 may be connected to the main support part 400. Additionally, the connector 200 may have a virtual rotation axis extending in the front and rear direction on one side and may rotate about the virtual rotation axis. Here, the virtual rotation axis may be parallel to the rotation axis of the handle 600 and may be coaxial. For this reason, when the handle 600 is rotated by the user, the other side of the connector 200 can rotate about one side thereof in accordance with the handle 600. In this case, the main support part 400 connected to the other side of the connector 200 can also be moved.

Meanwhile, an engaging member 210 that can engage with a locking member 420 may be formed in the connector 200. For example, the engaging member 210 may have a hole shape into which the locking member 420 can be inserted. However, this is merely an example, and the engaging member 210 may have a protrusion shape that can be engaged with the locking member 420 having a hole shape. The engaging member 210 may extend to have a predetermined length, and the locking member 420 can move within the engaging member 210. For this reason, when the connector 200 rotates about one side thereof, the main support part 400 can move in a straight line due to the rotation of the other side of the connector 200. Meanwhile, the connector 200 may be supported by the main support part 400 at the rearward of the main support part 400.

The locking part 300 can lock the safe door 20 into the safe case 10. The locking part 300 may be placed in either a locked state or an open state. For example, when the locking part 300 is in the locked state, the locking part 300 may be placed at a position where it protrudes more outward from the body part 100 than in the open state. That is, the locking part 300 may protrude from the body part 100 and thus at least a portion of the side surface of the locking part 300 is exposed to the outside of the body part 100. Additionally, when the locking part 300 is placed in the open state, the lock part 300 may be placed at a position where it deviates from the locked state. For example, at least a portion of the side surface of the locking part 300 may be retracted into the body part 100 such that it does not protrude toward the outside of the body part 100 or may less protrude from the body part 100 than in the locked state.

The locking part 300 is supported on the main support part 400 and can move when the main support part 400 moves. The locking part 300 may be in the open state when the main support part 400 moves to one side in the second direction (e.g., the left side of FIG. 4). Additionally, the locking part 300 may be in the locked state when the main support part 400 moves to the other side in the second direction (e.g., the right side of FIG. 4). The locking part 300 may include a first locking shaft 310 and a second locking shaft 320.

The first locking shaft 310 may be supported on the main support part 400 to move in the second direction (y-axis direction). The first locking shaft 310 can move in the second direction (y-axis direction) when the main support part 400 moves in the second direction, and the state thereof can be switched. Further, a plurality of first locking shafts 310 may be provided, and the plurality of first locking shafts 310 may be disposed to be spaced apart from each other in the third direction. Further, some of the plurality of first locking shafts 310, disposed on the outermost side in the third direction (z-axis direction), may be positioned adjacent to both ends of the body part 100 in the third direction.

The second locking shaft 320 can move in the third direction. The second locking shaft 320 can move in the third direction and the state thereof can be switched when the main support part 400 moves in the second direction. Further, a plurality of second locking shafts 320 may be provided. Some of the second locking shafts 320 may be disposed on the upper side of the body part 100 and protrude upward. Others of the plurality of second locking shafts 320 may be disposed on the lower side of the body part 100 and protrude downward.

The main support part 400 supports the locking part 300 and may be configured to be relatively movable with respect to the body part 100. Further, the main support part 400 can move in the second direction according to rotation of the connector 200. For example, the main support part 400 can move in the second direction in response to rotation of the connector 200 such that the locking part 300 switches from one of the locked state and the open state to the other state. The main support part 400 can support the locking part 300 at the rearward than the locking part 300. Further, the main support part 400 may be extended in the third direction to support the plurality of first locking shafts 310 spaced apart in the third direction.

The main support part 400 may include a main guide 410, the locking member 420, a first main rod 440, and a second main rod 450. The main guide 410 engages with the second locking shaft 320 and can guide the movement of the second locking shaft 320. The main guide 410 may include a first main guide 411, a second main guide 412, and a third main guide 413.

The first main guide 411 is formed in the upper side of the main support part 400 and may have a hole shape penetrating the main support part 400. The first main guide 411 extends in a direction deviating from the second direction and the third direction, and for example, may extend to be inclined upward.

The second main guide 412 is formed on the lower side of the main support part 400 and may have a hole shape penetrating the main support part 400. The second main guide 412 extends in a direction deviating from the second direction and the third direction, and for example, may extend to be inclined downward.

The third main guide 413 may be located between the first main guide 411 and the second main guide 412 and may have a hole shape penetrating the main support part 400. The third main guide 413 may extend in the second direction.

The locking member 420 may engage with the engaging member 210 of the connector 200. The locking member 420 may be formed to protrude rearward from the main support part 400. The locking member 420 can transmit the rotational power of the connector 200 to the main support part 400 when the connector 200 rotates.

The first main rod 440 may extend from the top of the main support part 400 in the second direction. A rod recess 441 that can be restrained by a relocking member 930 of the relocking unit 900 may be formed in the upper portion of the first main rod 440. A hole (not shown) that can be restrained by a second locking unit 820 may be formed in the lower portion of the first main rod 440. When the second locking unit 820 is inserted into the hole of the first main rod 440, the movement of the main support part 400 in the second direction can be restricted.

The second main rod 450 may extend in the lower portion of the main support part 400 in the second direction. A rod recess 441 that can be restrained by the relocking member 930 of the relocking unit 900 may be formed in the upper portion of the second main rod 450. A hole (not shown) that can be restrained by the second locking unit 820 may be formed in the lower portion of the second main rod 450. When the second locking unit 820 is inserted into the hole of the second main rod 450, the movement of the main support part 400 in the second direction can be restricted.

The handle 600 may provide a portion to be held by the user. The handle 600 is supported on the body part 100, and at least a portion thereof may be disposed outside the body part 100. The handle 600 may include a grip part held by the user and a rotation axis connected to the connector 200.

The base part 700 can support the locking unit 800 and the relocking unit 900. The base part 700 is supported by the body part 100 and may be disposed at the center of the body part 100. The safety glass 710 may be disposed on the rear surface of the base part 700.

The safety glass 710 may be disposed between the base part 700 and the body part 100. The safety glass 710 may have a size at least greater than the base part 700. A catching hole 711 may be formed in the safety glass 710 such that a bracket hook 923 of the relocking unit 900 can be caught, and thus the safety glass 710 can rapidly break due to an external impact when an illegal intrusion attempt into the safe 1 occurs (see, FIG. 6).

If an illegal intrusion attempt into the safe 1 occurs, for example, if the body part 100 falls off due to an external attack on the safe 1, the surrounding area of the catching hole 711 in which the bracket hook 923 is caught is damaged and thus the safety glass 710 may break.

The locking unit 800 can restrict or allow the movement of the main support part 400, that is, the movement of the locking part 300. The locking unit 800 may include a first locking unit 810 and the second locking unit 820.

The first locking unit 810 can restrict or allow the movement of the main support part 400. The first locking unit 810 may include a first locking bar that moves to a locking position or a releasing position. When the first locking bar moves to the locking position, the main support part 400 can be restrained, and when the first locking bar moves to the releasing position, the first locking bar can be spaced apart from the main support part 400.

The second locking unit 820 can restrict or allow movement of the main support part 400 through the first main rod 440 and the second main rod 450. The second locking unit 820 may include a second locking bar that moves to a locking position or a releasing position. When the second locking bar moves to the locking position, the first main rod 440 and the second main rod 450 can be restrained, and when the second locking bar moves to the releasing position, the second locking bar can be spaced apart from the first main rod 440 and the second main rod 450.

In this manner, the safe door 20 according to an embodiment of the present disclosure has the effect of easily locking or opening the safe door 20 by the configuration of the connector 200, the locking part 300, and the main support part 400. In addition, the body part 100 is composed of the plurality of bodies 110, 120, and 130, and thus an intruder cannot easily penetrate the body part 100, and the time required to open the safe 1 can be maximized.

Referring to FIGS. 5 to 8, the relocking unit 900 can provide a lock protection function through a relocking bracket 920 that protects an actuator 910, and allow the locking unit 800 to operate by breaking the safety glass 710 when an external force is applied to force the locking part 300 to change from the locked state to the open state.

The relocking unit 900 can be driven by rotating a key or entering a password. When the relocking unit 900 is driven, the relocking unit 900 may cause the locking part 300 to be in one of the locked state and the open state deviating from the locked state.

The relocking unit 900 may include the actuator 910, the relocking bracket 920, a relocking member 930, and a support spring 940. The actuator 910 may be provided on the base part. The actuator 910 can provide an operating force for relocking to the relocking member 930 through an extension bolt 911 when the key is rotated or the password is input. The actuator 910 can be protected from external attack (impact) by the relocking bracket 920.

The relocking bracket 920 may be provided to be movable up and down on the base part such that it can be moved up and down by the operation of the actuator 910. The relocking bracket 920 may include a bracket frame 921, a bracket guide groove 922, and the bracket hook 923.

The bracket frame 921 of the relocking bracket 920 may be provided in the form of a bracket that entirely surrounds the outer shape of the actuator 910. The bracket guide groove 922 may be provided on both sides of the bracket frame 921. A bracket hole 921*a* into which a connecting rod 932 is inserted may be formed at the upper end of the bracket frame 921. The bracket guide groove 922 may be formed to extend parallel to the moving direction of a relocking pin 931 on one side of the bracket frame 921. The bracket guide groove 922 can guide the up and down movement of the bracket frame 921.

Further, the bracket hook 923 of the relocking bracket 920 may be formed integrally with the other side of the bracket frame 921. The bracket hook 923 may penetrate the base part 700 and be inserted into the catching hole 711 of the safety glass 710.

In particular, when the relocking unit 900 locks the locking part 300, the bracket hook 923 may be caught in the catching hole 711 of the safety glass 710. At this time, when an external force is applied to force the locking part 300 to change from the locked state to the open state, the safety glass 710 held by the bracket hook 923 may be broken by the external force. When the safety glass 710 break, the locking unit 800 can be activated to lock the locking part 300.

The relocking member 930 may be mounted on the end of the relocking bracket 920. The relocking member 930 may restrain the first main rod 440 of the main support part 400 while being lifted and lowered by the movement of the relocking bracket 920 according to the operation of the actuator 910. The relocking member 930 may include the relocking pin 931, the connecting rod 932, a connecting pin 933, and an elastic spring 934.

The relocking pin 931 of the relocking member 930 can selectively restrain the first main rod 440 of the main support part 400. For example, upon lowering due to the movement of the relocking bracket 920, the relocking pin 931 can be inserted into the rod recess 441 formed in the first main rod 440 of the main support part 400 to restrain movement of the first main rod 440. A through hole 931*a* through which the connecting rod 932 passes may be formed at the upper portion of the relocking pin 931.

The connecting rod 932 may be coupled between the relocking bracket 920 and the relocking pin 931. At this time, one end of the connecting rod 932 may be connected to the end of the relocking bracket 920, and the other end of the connecting rod 932 may be connected to the relocking pin 931. A connecting groove 932*a* accommodating the elastic spring 934 may be formed at the other end of the connecting rod 932.

The connecting pin 933 may be mounted in the connecting groove 932*a* to be removable at the end of the connecting rod 932. When the relocking pin 931 restrains the main support part 400, the connecting pin 933 can be inserted into a fixing groove 101 formed in the body part. At this time, the connecting pin 933 may be elastically supported in the connecting groove 932*a* by the elastic spring 934.

In this manner, the safe door 20 according to an embodiment of the present disclosure can provide the lock protection function through the relocking unit 900 using the configuration of the relocking unit 900 when an illegal intrusion attempt into the safe 1 occurs, and at the same time, cause the safety glass to break in the event of an external attack on the safe, allowing security measures for the safe 1 to be rapidly activated.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A safe door comprising:

a body part;

a locking part configured to be in one of a locked state in which the lock part protrudes from the body part and an open state in which the locking part is deviated from the locked state;

a relocking unit configured to restrict a movement of the locking part;

a main support part supporting the locking part and configured to be movable with respect to the body part;

a connector having one side in which a virtual rotation axis extending in a front and rear direction, and the other side connected to the main support part; and a base part mounted on the body part to support the relocking unit, wherein the relocking unit comprises:

an actuator;

a relocking bracket provided in a bracket form covering an outer shape of the actuator and movable by operation of the actuator; and a relocking member mounted on an end of the relocking bracket and configured to restrain the locking part by movement of the relocking bracket, wherein the relocking member includes:

a relocking pin configured to be fixed to a first main rod of the main support part to restrain the locking part;

a connecting rod having one end portion connected to an end portion of the relocking bracket and the other end portion connected to the relocking pin, a connecting groove being formed in the other end portion of the connecting rod;

a connecting pin mounted in the connecting groove to be removable at an end of the connecting rod and inserted into a fixing groove formed in the body part when the relocking pin restrains the main support part; and an elastic spring for elastically supporting the connecting pin in the connecting groove.

2. The safe door of claim 1, wherein the relocking unit allows the locking part to be in one of the locked state and the open state through a movement of the relocking member in response to the operation of the actuator.

3. The safe door of claim 1, wherein the relocking bracket comprises:

a bracket frame provided in a bracket form covering a side and a bottom of the actuator; and a bracket guide groove formed on one side of the bracket frame to be parallel to a moving direction of the relocking pin.

4. The safe door of claim 3, further comprising:

safety glass disposed adjacent to the body part and configured to be broken when an external force is applied to force the locking part to change from the locked state to the open state.

5. The safe door of claim 4, wherein the safety glass is disposed between the body part and the base part, and includes a catching hole extending in an up and down direction.

6. The safe door of claim 5, wherein the relocking bracket further comprises:

a bracket hook protruding toward the safety glass to be hooked in the catching hole of the safety glass.

7. The safe door of claim 6, wherein the bracket hook is formed integrally with the other side of the bracket frame to be lifted and lowered together with the bracket frame when the bracket frame is lifted and lowered in the locked state for locking the locking part and the open state deviated from the locked state.

8. The safe door of claim 1, wherein the locking part includes a plurality of locking shafts spaced apart from each other along a periphery of the body part, and wherein the main support part is configured to be movable in a first direction in response to the connector rotating about the rotation axis such that the locking part is switched from one of the locked state and the open state to the other state, some of the plurality of locking shafts are configured to move in the first direction, and others of the plurality of locking shafts are configured to move in a second direction perpendicular to the first direction.

9. A safe comprising:

a safe case having a predetermined space formed inside; and a safe door configured to selectively open and close the space inside the safe case with respect to an outside, wherein the safe door includes:

a body part;

a locking part configured to be in one of a locked state in which the locking part protrudes from the body part toward the outside and an open state in which the locking part is deviated from the locked state;

a relocking unit for restricting movement of the locking part when an external impact is applied; and safety glass disposed adjacent to the body part and configured to broken when an external force is applied to force the locking part to change from the locked state to the open state, wherein the relocking unit includes:

an actuator;

a relocking bracket provided in a bracket form covering an outer shape of the actuator and movable by operation of the actuator; and a relocking member mounted on an end of the relocking bracket and configured to restrain the locking part when the relocking bracket moves, wherein the relocking bracket includes a bracket hook protruding toward the safety glass to be caught in a catching hole of the safety glass.

10. The safe of claim 9, wherein the relocking unit allows the locking part to be in one of the locked state and the open state through movement of the relocking member in response to the operation of the actuator.

11. A safe door comprising:

a body part;

a locking part configured to be in one of a locked state in which the locking part protrudes from the body part and an open state in which the locking part is deviated from the locked state;

a relocking unit configured to restrict a movement of the locking part;

safety glass disposed adjacent to the body part and configured to broken when an external force is applied to force the locking part to change from the locked state to the open state, wherein the relocking unit includes:

an actuator;

a relocking bracket provided in a bracket form covering an outer shape of the actuator and movable by operation of the actuator; and a relocking member mounted on an end of the relocking bracket and configured to restrain the locking part when the relocking bracket moves, wherein the relocking bracket includes a bracket hook protruding toward the safety glass to be caught in a catching hole of the safety glass.

* * * * *